T. I. DUFFY.
AUTOMOBILE HEADLIGHT.
APPLICATION FILED JUNE 16, 1917.

1,264,779.

Patented Apr. 30, 1918.
2 SHEETS—SHEET 1.

Witness:
O. R. Plunkett

Inventor:
Thomas I. Duffy,
by Burton & Burton
his Attys.

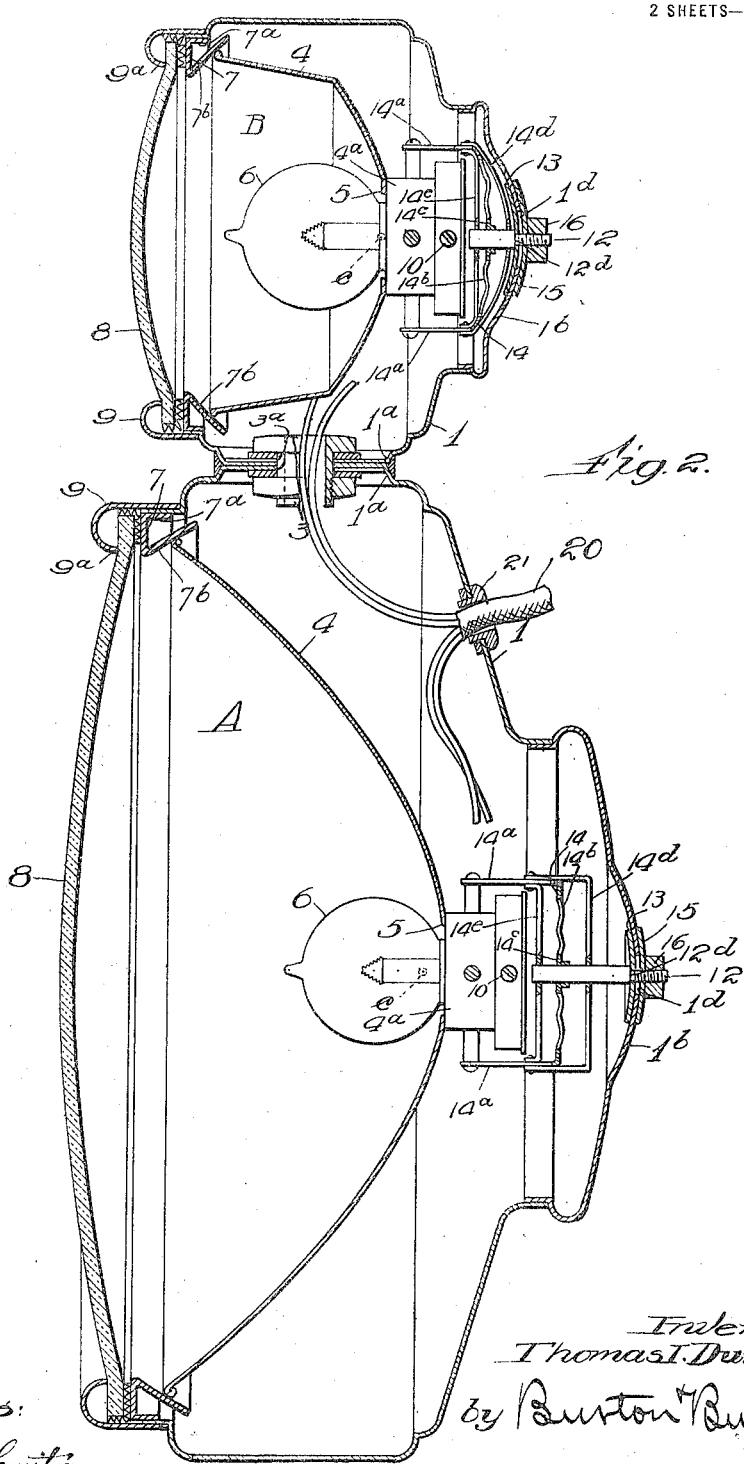

UNITED STATES PATENT OFFICE.

THOMAS I. DUFFY, OF CHICAGO, ILLINOIS.

AUTOMOBILE-HEADLIGHT.

1,264,779. Specification of Letters Patent. Patented Apr. 30, 1918.

Application filed June 16, 1917. Serial No. 175,230.

*To all whom it may concern:*

Be it known that I, THOMAS I. DUFFY, a citizen of the United States, residing at Chicago, in the county of Cook and the State of Illinois, have invented certain new and useful Improvements in Automobile-Headlights, of which the following is a specification, reference being had to the accompanying drawings, forming a part thereof.

The purpose of this invention is to provide an improved construction of headlight for an automobile, particularly designed for permitting the independent aiming of the several headlights for different circumstances and for their respective uses. It consists in the elements and features of construction shown and described, as indicated in the claims.

In the drawings:

Fig. 2 is a vertical axial section of the headlight shown in Fig. 1.

Figure 1:
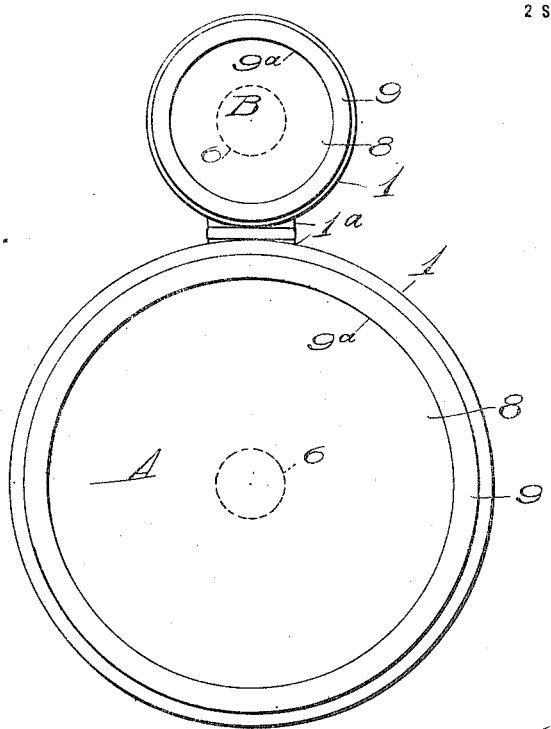
Figure 1 is a front elevation of a double headlight embodying this invention.

The complete headlight device shown in the drawings, comprises a large headlight, A, and a small headlight, B, having their casings rigidly secured together so that they are adapted to be mounted unitarily upon the automobile frame. In each of these headlights, the general construction is the same although the detail designs are different, and the corresponding or similar parts will be designated by the same reference characters in the following description, which applies to both the large and small headlight.

The headlight comprises a main casing member, 1, which is substantially circular about a horizontal axis, having, however, at one side, an exterior departure from such circular form, consisting of a flat-faced boss, $1^a$, the two headlights being secured together at said bosses, the bosses being reciprocally corrugated for inter-engagement and seating upon each other and being clamped together by a short bolt, 3, taking through apertures, $3^a$, situated centrally with respect to said bosses. The bolt, 3, is made tubular or hollow from end to end for convenience of extending therethrough the electric circuit wires, 20, which may be led in through the casing of either headlight as through the bushing, 21, and branched for the other headlight. The main casing is open at the front for the insertion of all the lamp members through the front, said members comprising the reflector, 4, which has a hub or base, 5, carrying the lamp socket in which the lamp, 6, is mounted, a bezel, 7, in front of the reflector, and a crystal, 8, in front of the bezel. All said parts are retained in the main casing by a crystal-retaining ring, 9, screwed or tightly telescoped onto the forward open end of the main casing and having an internally-projecting flange, $9^a$, overhanging and engaging the crystal and thereby stopping the latter and all the parts behind it in the casing.

The bezel, 7, is desirably formed of sheet metal folded, pressed or spun into the form shown in the drawings, being right-angular in radial section at the fold which forms the outer circumference where the lip, $7^a$, fits snugly into the forward mouth of the casing, having the flange, $7^b$, which faces inwardly with respect to the casing spheroidal in form about any convenient selected center within the casing, the center as shown in the drawings being at the point, $c$, in the axis of the reflector and the lamp. The reflector, 4, is forwardly concave and preferably parabolic in its curvature for some distance out from the axis, the forward edge, which is of course circular, being seated upon the spheroidal surface, $7^b$, so that the reflector may be adjusted by sliding in all directions upon said spheroidal surface for shifting the direction of its axis. The casing has a spheroidally formed portion, $1^b$, which is spherically curved about the same center, $c$, which governs the curvature of the spheroidal surface, $7^b$, of the bezel, 7, said spheroidal portion in the structure as illustrated being at the back, that is, opposite the opening which is closed by the crystal. The reflector has a central hub or base, $4^a$, of insulating material for the purpose of holding a lamp socket, and affording mounting for the electric contact pieces seen at 10; and by means of this base, and secured to it, there is provided a stem for the reflector which terminates in a threaded portion, 12, which extends through an aperture, $1^d$, situated centrally with respect to the spheroidal portion, $1^b$, of the case, said aperture being enough larger than the diameter of said threaded stem, 12, to afford range of lateral movement for said stem sufficient to accommodate the entire adjustment of the reflector which is desired for the purpose of aiming it, or directing its axis. The adjustment of the reflector in this range is caused to occur about the center, $c$, by means of a member, 13, on the reflector or stem, preferably, as shown, in the form of a cupped or spheroidal disk which is stopped against a shoulder, $12^d$, on the stem inside the case, and is seated on the inner surface of said spheroidal portion, $1^b$, overlapping and covering the opening through which the stem protrudes, and of enough greater diameter than said opening to cover the same throughout the entire range of adjustment of the reflector and consequent variation of the position of the stem in said aperture. The reflector is secured at adjusted position by means of a second clamping member, 15, on the stem, 12, outside the spheroidal portion, $1^b$, and seating thereon, a nut, 16, engaging the threaded extremity of the stem serving to clamp the two members, 13 and 15, together or toward each other against the intervening spheroidal portion of the casing around the aperture through which the stem extends. In order that the reflector may be held snugly against the bezel as well as against the casing, so that there may be no rattling of the parts in the travel of the vehicle, the stem by which the reflector is held to the back of the casing as described comprises a spring portion which reacts in the direction of the axis of the stem and so tends to seat the forward edge of the reflector snugly on the bezel. In order that this spring portion shall not prevent the stem from being substantially rigid in respect to its purpose or function of handling the reflector in the adjustment of the latter, but shall have its elasticity only for reaction in the direction of the axis, it may be constructed and connected as shown, consisting of a cage-like portion, comprising a plurality of arms, $14^a$, extending parallel in a circular group from an annulus, 14, and secured at their forward ends rigidly to the hub or insulating base, $4^a$, of the reflector, said annulus, 14, being at a plane back of the lamp and reflector base, and having a plurality of radial spring arms, $14^b$, connecting it with a central portion, $14^c$, from which the threaded stem member, 12, projects rigidly at the axis of the reflector and lamp. Said radial arms, $14^b$, for adequate elasticity may be crimped or transversely corrugated or sinuous as shown, so that the entire cage-like portion of the stem, with the reflector carried by it, may be movable in the direction of the reflector axis, while the threaded terminal, 12, of the stem remains fixed and rigid at its connection with the casing. It will be understood that the parts are so proportioned that when the reflector is inserted into position, and the stem is secured in the back of the case arm, the reflector is followed by the bezel and the latter by the crystal, and that in turn by the retaining ring. The elastic radial arms, $14^b$, of the stem will be flexed somewhat out of their normal form, so that they will be reacting elastically for pressing the reflector forward against the bezel.

For adjusting the reflector to direct the axis of the light beam as desired, the nut, 16, being slacked, the operator by means of the stem may turn the entire reflector, carrying also the lamp, until the beam is projected in the direction desired, and then the nut being clamped tight, the reflector will be secured, being at all times seated at its forward edge upon the spheroidal surface, $7^b$, of the bezel, and sliding over it in whatever direction necessary to accommodate the adjustment.

It will be obvious that the outer clamping member, 15, and the nut, 16, may be rigid with each other, or even unitary without departing from the essential feature of the construction for adjusting and securing the reflector. They are shown unitary in the drawings, but they are nevertheless probably to be distinguishable elements of the combination.

For the purpose of affording stiff connection by which the stem member, 12, may swing the reflector positively while the latter is pressed snugly at its forward edge against the bezel, tending to cause friction which would resist the swinging movement, there are provided two cross bars, $14^d$ and $14^e$, rigid with the arms, $14^a$, and spaced apart along the axis of the stem member, 12, and apertured for the stem to extend through them with freedom for sliding, but without sensible lateral play. The spacing apart of these cross bars makes the stem member, 12, rigid with the cage, as respects the angular movement of the stem for swinging the reflector, while in no wise interfering with the direct longitudinal or axial movement relatively of said stem and reflector, which is permitted by the elasticity of the radial spring arms, $14^b$.

Figure 4:
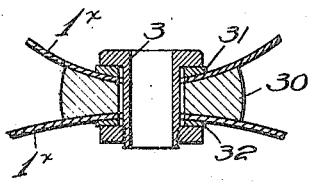
Figs. 4 and 5 are detail sections axial with respect to the tubular connections between the two openings showing a modification of the structure at their said junction.
Figure 5:
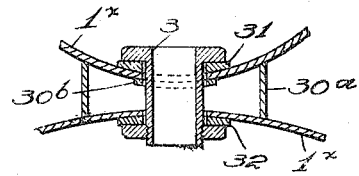
Figure 3:
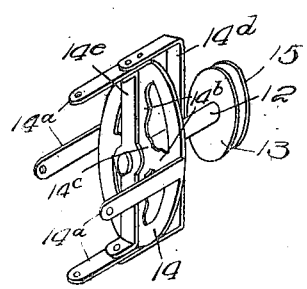
Fig. 3 is a perspective view of the spring stem of the reflector with its clamping members.

In Figs. 4 and 5 there are shown detail modifications of the form of the two lamp casings for connection with each other, both of these modifications the bosses heretofore mentioned are dispensed with, both that casing being uninterruptedly circular. In the form shown in Fig. 4 there is interposed between them a centrally apertured block, 30, having its opposite faces concave to fit the form of the casing respectively, and in Fig. 5 instead of the block there is interposed a short cylinder, $30^a$. The two casings are secured together by the hollow bolt, 3, in the same manner as in the main structure first described.

For securing together the large and small casings, 1, it is not absolutely essential that said casings be provided with flat faced bosses, 1ª, shown in Fig. 2. As an alternative, each casing may be simply apertured to receive the hollow bolt, 3, and a spacing washer, 30, with properly concaved upper and lower surfaces, may be interposed between the two cylindrical casings, 1, as shown in Fig. 4. If desired, instead of making the spacer as a solid washer, 30, it may be formed as a stamping comprising merely a peripheral flange, 30ª, and a diametral bridge member, 30ᵇ, apertured to receive the hollow bolt, 3, and thus serving to center the spacer with respect thereto. This construction is shown in Fig. 5. In both cases washers, 31 and 32, each having one curved face, will be inserted under the head and under the nut respectively of the bolt, 3.

1 claim:—

1. In combination with a main casing having a front aperture for emergence of the light beam, a reflector facing said beam aperture, the casing having a spheroidally-surfaced portion provided with an aperture, the reflector having a stem extending through said last-mentioned aperture with freedom of lateral movement therein to adjust the reflector as to the direction of its axis; two clamping members on said stem spanning said last-mentioned aperture, and seating on the spheroidal surface thereabout, respectively at the inner side and at the outer side of the casing, and a nut on the stem for clamping said members onto said spheroidal surface.

2. In combination with a main casing having a front aperture for emergence of the light beam, an annular member encompassing said aperture having a spheroidal surface; a reflector having a circular edge seating on said spheroidal surface, the casing having a spheroidally-surfaced portion formed with an aperture, the reflector having a stem extending through said last mentioned aperture with freedom of lateral movement therein to adjust the reflector in the direction of its axis; two clamping members on said stem, spanning said aperture and seating on the spheroidal surface of the casing there-about, respectively at the inner side and at the outer side of the casing, and a nut on the stem for clamping said clamping members onto said spheroidal surface.

3. In combination with a main casing having at the back a central opening; a reflector in said casing having a stem extending from the back through said opening of the casing with freedom for lateral movement therein to adjust the reflector with respect to the direction of its axis; clamping members on said stem, respectively inside and outside the casing, spanning said aperture for seating about the margins thereof, and a nut on said stem for clamping said two members to the casing.

4. In combination with a main casing having an aperture at the back, a reflector in said casing having a stem extending through said aperture with freedom for lateral movement therein for adjustment of the reflector with respect to the direction of its axis; a bezel at the front of the case surrounding its front opening having a spheroidal surface, the forward edge of the reflector being seated upon said spheroidal surface, the back of the case at the portion in which said aperture in said back is formed having also a spheroidal surface concentric with the spheroidal surface of the bezel; clamping members on the reflector stem respectively inside and outside the case, spanning said aperture in the back, and means on the stem for clamping said members onto said spheroidal surface of the back.

5. In combination with a main casing, open at the front for introduction of the lamp members, a bezel within the central opening, and a retaining ring engaged with the casing for stopping the bezel forwardly, said bezel having an annular spheroidal surface; a forwardly-concave reflector within the casing having its forward circumferential edge seated upon said spheroidal surface of the bezel; the back of the casing having a spheroidal surface concentric with the spheroidal surface of the bezel, and an aperture in said spheroidal surface, the reflector having a stem which extends through said aperture with lateral freedom therein to accommodate the adjustment of the reflector with respect to the direction of its axis; two clamping members respectively inside and outside said aperture of the case, and means on the stem for clamping them to said spheroidal surface about said aperture.

6. In combination with a main casing, open at the front for introduction of the lamp members, a bezel adapted to be introduced through the open front and a retaining ring for stopping it forwardly, said bezel having an annular spheroidal surface encompassing its central opening, the casing having at the back a spheroidal surface apertured at the center and concentric with the spheroidal surface of the bezel; a forwardly-concave reflector in the casing having its forward circumferential edge seated upon the spheroidal surface of the bezel, said reflector having a stem protruding through said central aperture of the back, and two clamping members on said stem respectively inside and outside the casing, each adapted to span said central opening for seating on the spheroidal surface of the back around said opening, and means for clamping them on the stem.

7. In combination with a main casing, open at the front for introduction of the lamp members; a bezel adapted to be introduced through said open front, and means for retaining it and stopping it forwardly, said bezel having an annular spheroidal surface encompassing its central opening, a casing having at the back a spheroidal surface having a central aperture, said spheroidal surface being co-axial with the spheroidal surface of the bezel; a forwardly-concave reflector in the casing having its forwardly-circumferential edge seated upon the spheroidal surface of the bezel and having an axial stem which is spring-connected with the reflector for yielding in the direction of its axis, said stem extending out through the central aperture of the back; two clamping members on said stem respectively inside and outside the casing and spanning said aperture for seating upon the spheroidal surface surrounding the same, and means for clamping said clamping members on the stem.

8. A headlight device comprising two independent headlights, having their casings provided with bosses reciprocal with each other for relative engagement; and a bolt clamping the casings together at said bosses; the reflectors in said headlights being independently adjustable with respect to the casings in which they are respectively contained for aiming the headlights independently of each other.

In testimony whereof, I have hereunto set my hand at Chicago, Illinois, this 29th day of May, 1917.

THOMAS I. DUFFY.